US011984812B2

(12) United States Patent
Drofenik et al.

(10) Patent No.: US 11,984,812 B2
(45) Date of Patent: May 14, 2024

(54) DUAL ACTIVE BRIDGE CONVERTER CELL WITH SPLIT ENERGY TRANSFER INDUCTOR FOR OPTIMIZED CURRENT BALANCING IN THE MEDIUM FREQUENCY TRANSFORMER (MFT)

(71) Applicant: Hitachi Energy Ltd, Zürich (CH)

(72) Inventors: Uwe Drofenik, Zürich (CH); Thomas Gradinger, Aarau Rohr (CH); Francisco Canales, Baden-Dättwil (CH)

(73) Assignee: HITACHI ENERGY LTD, Zürich (CH)

( * ) Notice: Subject to any disclaimer, the term of this patent is extended or adjusted under 35 U.S.C. 154(b) by 251 days.

(21) Appl. No.: 17/631,457

(22) PCT Filed: Sep. 18, 2020

(86) PCT No.: PCT/EP2020/076070
§ 371 (c)(1),
(2) Date: Jan. 29, 2022

(87) PCT Pub. No.: WO2021/053128
PCT Pub. Date: Mar. 25, 2021

(65) Prior Publication Data
US 2022/0278624 A1    Sep. 1, 2022

(30) Foreign Application Priority Data

Sep. 20, 2019    (EP) .................................. 19198718

(51) Int. Cl.
*H02M 3/335*    (2006.01)
*H02M 3/00*    (2006.01)
(Continued)

(52) U.S. Cl.
CPC ......... *H02M 3/33584* (2013.01); *H02M 3/01* (2021.05); *H02M 3/33571* (2021.05);
(Continued)

(58) Field of Classification Search
CPC .... H02M 3/01; H02M 3/335; H02M 3/33571; H02M 3/33573; H02M 3/33584; H02M 3/337; H02M 1/0085
See application file for complete search history.

(56) References Cited

U.S. PATENT DOCUMENTS

| 5,245,520 A | 9/1993 | Imbertson |
| 6,081,435 A | 6/2000 | Mandelcorn et al. |

(Continued)

FOREIGN PATENT DOCUMENTS

| EP | 3046241 A2 | 7/2016 |
| EP | 2608980 B1 | 7/2018 |

(Continued)

OTHER PUBLICATIONS

Japanese Office Action, Japanese Patent Application No. 2022-513684, dated Apr. 3, 2023, 5 pages.
International Search Report and Written Opinion of the International Searching Authority, PCT/EP2020/076070, dated Oct. 26, 2020, 13 pages.

*Primary Examiner* — Gary L Laxton
(74) *Attorney, Agent, or Firm* — Sage Patent Group

(57) ABSTRACT

A dual active bridge DC/DC converter in accordance with the invention comprises a first DC link, preferably comprising a first DC link capacitor; a converter bridge connected to the first DC link; a transformer, preferably a medium frequency transformer, having a primary side and a secondary side; the primary side of the transformer comprising a plurality of M>1 primary windings, each of the plurality of primary windings having a first and a second terminal; wherein the dual active bridge DC/DC converter further comprises a first plurality of M energy transfer inductors;

(Continued)

and wherein for each of the M primary windings, a different one from the first plurality of energy transfer inductors is connected between said primary winding bridge and the converter bridge.

20 Claims, 4 Drawing Sheets

(51) Int. Cl.
     *H02M 3/337*      (2006.01)
     *H02M 1/00*      (2006.01)

(52) U.S. Cl.
     CPC ....... *H02M 3/33573* (2021.05); *H02M 3/337* (2013.01); *H02M 1/0085* (2021.05)

(56) References Cited

U.S. PATENT DOCUMENTS

| | | | |
|---|---|---|---|
| 6,344,979 B1 | 2/2002 | Huang et al. | |
| 10,819,244 B1 * | 10/2020 | Shi | H02M 3/33573 |
| 2021/0391801 A1 * | 12/2021 | Colonna | H02M 3/33576 |

FOREIGN PATENT DOCUMENTS

| | | | |
|---|---|---|---|
| GB | 2484970 | A | 5/2012 |
| JP | 2001268906 | A | 9/2001 |
| JP | 2016134932 | A | 7/2016 |
| JP | 2017070083 | A | 4/2017 |
| WO | WO 2012/025255 | A1 | 3/2012 |

\* cited by examiner

DUAL ACTIVE BRIDGE CONVERTER CELL WITH SPLIT ENERGY TRANSFER INDUCTOR FOR OPTIMIZED CURRENT BALANCING IN THE MEDIUM FREQUENCY TRANSFORMER (MFT)

CROSS REFERENCE TO RELATED APPLICATIONS

This application is a 35 U.S.C. § 371 national stage application of PCT International Application No. PCT/EP2020/076070 filed on Sep. 18, 2020, which in turns claims foreign priority to European Patent Application No. 19198718.9, filed on Sep. 20, 2019, the disclosures and content of which are incorporated by reference herein in their entirety.

TECHNICAL FIELD

The present disclosure pertains to the field of power electronics. It relates to a dual active bridge DC/DC converter in accordance with the independent patent claim.

BACKGROUND

Transformers which deal with high current (several 100 Amps and more, in particular above 200 A) at high frequencies of several kilohertz (in particular above 3 kHz or much higher) are very difficult to build with low-cost and/or off-the-shelf components due to several effects which are negligible at lower frequencies, in particular at frequencies below 1 kHz, and/or for low currents, in particular currents below 100 A. Typical applications involving such high frequencies and/or currents are medium frequency transformers as frequently used in solid state transformers, especially for SSTs configured as AC/DC converters for connected distributed power to the medium voltage (MV) grid as in Electric vehicle (EV) fast charging
Photovoltaic (PV) solar
Battery energy storage systems (BESS)
Wind onshore and offshore
Datacenter but also transformers without MV insulation requirements as frequently used in high-power low-voltage DC/DC converters with galvanic insulation which are required in the charging pole of EV fast chargers. One particular example of such DC/DC converters are dual active bridge converters, as exemplary described in Swiss patent application publication CH 707 533 A2 or US patent application publication CH 2018/0159435 A1, both of which are hereby included by reference in their entirety.

For keeping high-frequency losses in transformer coils small, one way is to employ litz wire to form the coils' windings. While litz wire is several times more expensive than solid copper wire, it may be purchased "off-the-shelf" for AC currents up to 100-200 A (root-mean-square, rms). Litz wire consists of a large number of transposed strands generally made from copper, and is available off-the-shelf in total cross-sections up to 0.5 cm$^2$ which allows maximum current in the range of 100-200 Arms (assuming a filling factor of between 0.4 and 0.9, in particular of at least approximately 0.8, and a current density of 2.5 . . . 5 A/mm$^2$). Larger currents, as they are typical in above listed applications, require larger cross sections and will be increasingly difficult to bend. Litz wire is usually not made from aluminum because with aluminum it is extremely difficult to reliably contact all strands at a wire terminal (e.g. 900 strands of 0.2 mm diameter each in above mentioned copper litz wire). Copper litz wire is at least 2-4 times more expensive than solid copper, and copper is around 3 times more expensive than aluminum. For higher current (>100 A) as they are typical in the applications listed above, several copper litz wires have to be paralleled, which often results, due to stray flux between the paralleled wires, in circulating currents, which can increase the losses significantly.

For optimization and/or minimization of manufacturing effort and required resources, aluminium foil windings and/or solid copper as commonly employed in 50 Hz transformers would be a favoured choice for the coils. At high frequency, the winding losses in a foil increase significantly due to skin- and proximity effects. If a single foil is employed, the frequency defines a required foil thickness, a desired or required current defines a foil height, and this results in a transformer height. For large current and high frequency, the transformer shape will thus strongly deviate from a cube-shape which results much higher weight, core losses, and increased requirement in resources and effort (higher core volume required).

If parallel foils are employed, an individual foil height may be reduced, but due to the stray field between paralleled foils strong circulating currents may be induced, which increase losses significantly (same effect as with paralleled wire).

In both designs, copper litz wire and foil, a main problem are circulating currents between the parallel conductors which increase winding losses, often significantly, thereby reducing a transformer power rating, and/or significantly increase a transformer cost (USD/kW). In prospective distributed energy applications like EV fast charging, PV solar, battery energy storage systems, wind, or datacentre, the medium frequency transformer (MFT) is a key component. For higher currents (in particular above 100 A), simply scaling up 50/60 Hz technology and/or employing off-the-shelf litz wire or low-cost foil wire results in huge losses due to high-frequency induced circulating currents which reduce transformer performance significantly.

Generation of circulating currents, in particular in a configuration of two or more wires foils or other conductors forming windings connected in parallel, with each winding comprising a plurality of turns, may be understood as follows: Each of the turns is exposed to a magnetic stray field, e.g. in a windings window formed by a core of the transformer. Parallel litz wires forming individual windings which are connected at input and output terminals of the transformer form a loop which is exposed to the magnetic stray field. The magnetic stray field changes with the MFT's operating frequency, resulting in a voltage which drives a circulating current in this loop. The circulating current adds to a nominal current in the MFT which may result in one litz wire carrying more than half of the nominal current, and the parallel one carrying accordingly less than half of the nominal current. If the circulating current is large enough, one litz wire can carry more than a total nominal current, and then the parallel one carries a negative (180° phase-shifted) current. In this way, not only is a total available copper cross section effectively reduced by 50%, but additional losses are introduced, and a maximum output power of the MFT is reduced by a factor two or more.

State-of-the-art solutions to limit circulating currents require extra components, higher manufacturing effort and additional space, and may lead to additional problems. One state-of-the-art solution, transposition of wires or foils connected in parallel, as for example provided by parallel wires twisted around one another or otherwise intertwined or interlaced, requires additional manufacturing effort, especially for foil windings, leads to an increased effective wire-length, exhibits limited efficiency in MFTs with only a few winding turns and may lead to high voltage insulation challenges, e.g. due to geometric inhomogeneities in a vicinity of transposition locations. Alternatively, common-mode filters may be added between the parallel wires or foils. However, this requires additional components, may thus lead to higher cost and higher manufacturing effort, and require additional space and/or other resources.

SUMMARY

It is an objective of the present disclosure to allow for efficient suppression of circulating currents in dual active bridge DC-to-DC converters. It is also an objective to allow to provide a method to fully block the circulating current by changing the topology of the dual active bridge DC/DC converter without any extra components or resources.

These objectives are achieved by a dual active bridge DC/DC converter with a feature combination according to independent patent claim. Further exemplary embodiments are evident from the dependent claims and the following description in combination with the accompanying drawings.

A dual active bridge DC/DC converter in accordance with embodiments of the present disclosure comprises a first DC link, preferably comprising a first DC link capacitor; a converter bridge connected to the first DC link; a transformer, preferably a medium frequency transformer, having a primary side and a secondary side; the primary side of the transformer comprising a plurality of M>1 primary windings, each of the plurality of primary windings having a first and a second terminal; wherein the dual active bridge DC/DC converter further comprises a first plurality of M energy transfer inductors; and wherein for each of the M primary windings, a different one from the first plurality of energy transfer inductors is connected between said primary winding bridge and the converter bridge.

The converter bridge may be regarded as part of a DC/AC converter or inverter having an input connected to the first DC link, which may in turn be connected to a grid via a converter, or to a DC electric power source like a PV solar system or a BESS, wherein the DC/AC converter is configured to provide an AC voltage and/or current at an output of said DC/AC converter.

The transformer may be regarded as part of an AC intermediate circuit having an input and/or primary side connected to the output of said DC/AC converter. The AC intermediate circuit may include additional elements, in particular inductors, connected in parallel with the input or an output or secondary side of the AC intermediate circuit, or in series between input or output of the AC intermediate circuit and the transformer. The transformer may, in particular, be provided with a single primary and/or a single secondary winding only, but will in general comprise a plurality of primary windings and/or a plurality of secondary windings.

The output and/or secondary side of the AC intermediate circuit may be connected to an input of an AC/DC converter configured to convert an AC current and/or voltage output by the AC intermediate circuit to a DC voltage and/or an (intermittent) DC current at an output of the AC/DC converter, which may in turn be connected, via a second converter bridge, to a second DC link, preferably comprising a second DC link capacitor, at which a load may be connected. If the converter is adapted for bi-directional operation, in particular allowing for bi-directional electric power flow, the load may at least temporarily also act as a generating source.

The first DC link may provide at least two voltage levels, in particular a zero or neutral level and a positive level. The first DC link may also, in particular, provide a positive level, a zero or neutral level, and a negative voltage level.

The dual active bridge DC/DC converter may comprise more than one converter bridge, in particular a total of N>1 converter bridges, connected in parallel to the first DC link, and may further comprise a second plurality of N energy transfer inductors and a common node, with each of the second plurality of N energy transfer inductors is connected between one of the converter bridges and the common node; and each of the first plurality of M energy transfer inductors is connected between the common node and the first terminal of a different one of the plurality of primary windings.

The converter bridge or the converter bridges may in particular be active bridges of arbitrary topology that can apply at least either one of two voltage levels as provided by the first DC link to the input, in particular to input terminals, of the AC intermediate circuit. This may include half-bridges, full bridges, star-point clamped bridges and any kind of multi-stage topologies. For example, a three-point bridge allows the application of a positive voltage, a negative voltage and a zero voltage to the input of the AC intermediate circuit.

Thus, the converter bridge or the converter bridges may comprise a plurality of switches, and corresponding switched connections, which allow to establish and interrupt connections between the input of the AC intermediate circuit and each of the voltage levels. The switches may, in particular, operate under control, by a control unit, control system or controller, which may be internal to the DC/AC converter, or may be provided externally. Control may, in particular, be closed-loop control.

Preferably, if a plurality of converter bridges connected in parallel to the first DC link are present, they all have identical topology. Preferably, corresponding switches of all the converter bridges are configured to operate in an at least essentially synchronized manner. In particular, the controller or control system, may switch all corresponding switches on at least essentially simultaneously, and may switch all corresponding switches off at least essentially simultaneously.

The switches may, in particular, be semiconductor switches including transistors, in particular BJTs (bipolar junction transistors), MOSFETs (metal oxide semiconductor field-effect transistors), IGBTs (integrated gate bipolar transistors); or thyristors, in particular GTOs (gate turn-off thyristors), GCTs (gate commutated thyristors), or IGCTs (integrated gate commutated thyristors).

The aspects as described above as well as further aspects of the various embodiments will become apparent from and elucidated with reference to the embodiments described in combination with the drawings hereinafter.

BRIEF DESCRIPTION OF THE DRAWINGS

The subject matter will be explained in more detail in the following text with reference to exemplary embodiments which are illustrated in the attached drawings.

In principle, identical reference symbols in the figures denote identical features or elements.

DETAILED DESCRIPTION OF EXEMPLARY EMBODIMENTS

Figure 1:
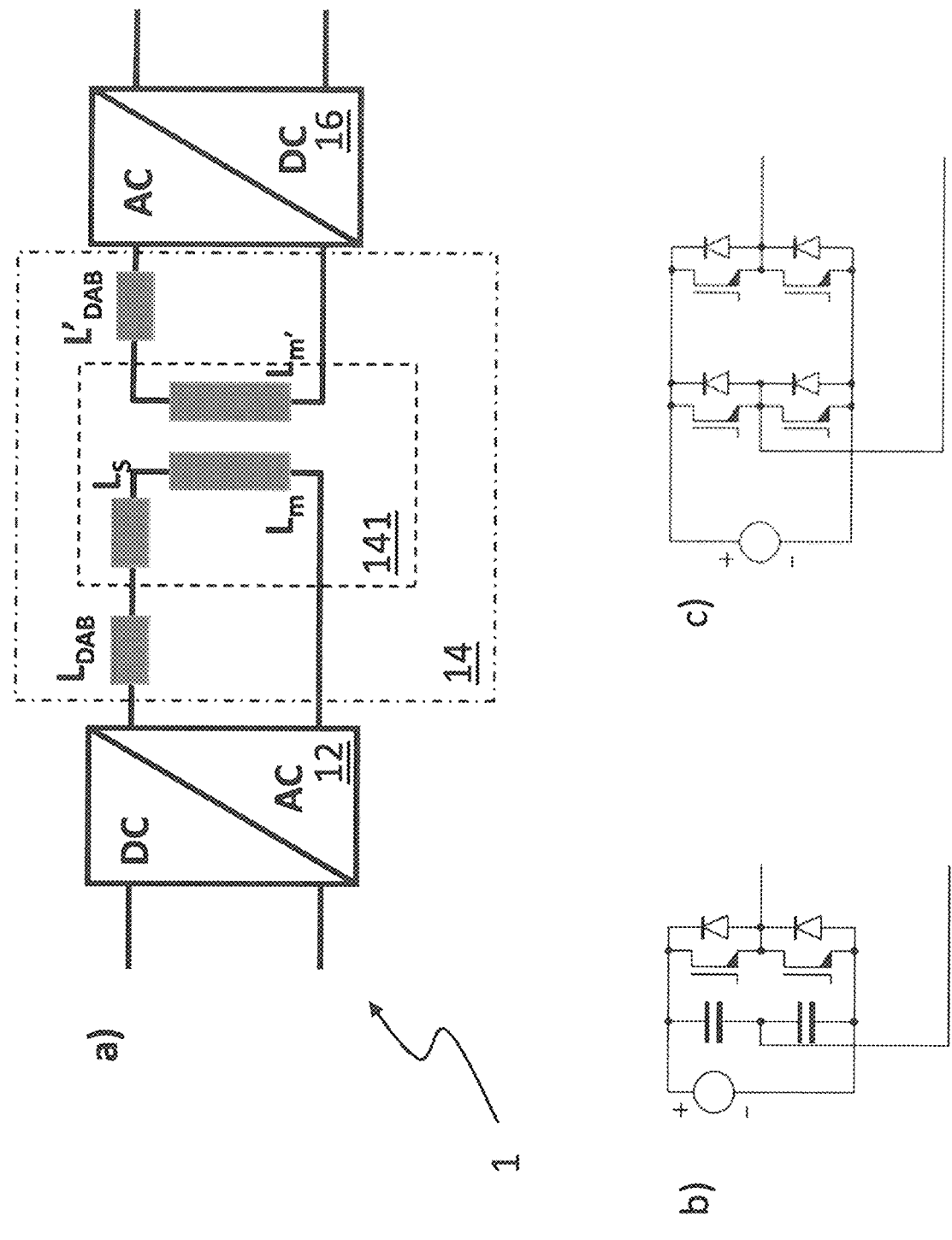
FIG. 1 illustrates a basic, prior art DC/DC dual active bridge (DAB) converter.

FIG. 1a) illustrates a basic, prior art dual active bridge DC/DC (DAB) converter 1 which may be considered as a potential starting point for the various embodiments. DC/AC converter 12 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14 comprising a transformer 141, in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via an inductor, sometimes referred to as an energy transfer inductor, having an inductance $L_{DAB}$. The transformer transforms voltage and/or current at its primary side in a known manner to a secondary side voltage and/or current. Said secondary side voltage and/or current is subsequently converted by AC/DC converter 16, into a DC voltage and/or current at the output of said AC/DC converter 16. An optional inductor connected between the secondary side of the transformer and the AD/DC converter preferably has an inductance $L'_{DAB}$ which preferably is at least essentially identical to $L_{DAB}$, in particular for a 1:1 transformer turns ratio. DC/AC converter 12 may, in particular, comprise a plurality of semiconductor switches arranged in a half-bridge configuration corresponding to the one shown in FIG. 1b), or arranged in a full-bridge configuration corresponding to the one shown in FIG. 1c). Likewise, AC/DC converter 16 may, in particular, comprise a plurality of semiconductor switches arranged in a half-bridge configuration corresponding to the one shown in FIG. 1b), or arranged in a full-bridge configuration corresponding to the one shown in FIG. 1c).

Figure 2:
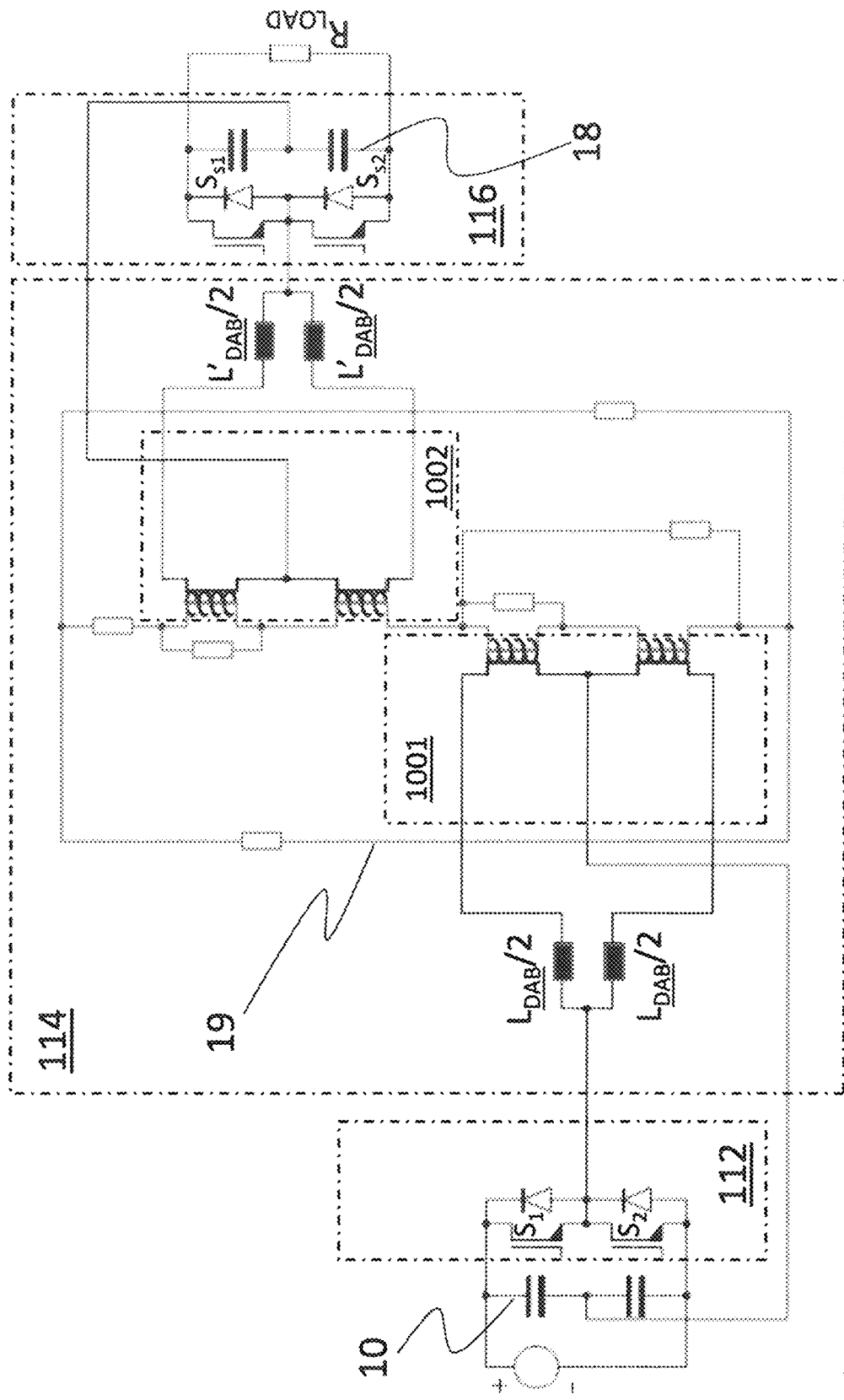
FIG. 2 shows a schematic of a dual active bridge DC/DC converter in accordance with an embodiment.

FIG. 2 shows a schematic of a dual active bridge DC/DC converter in accordance with an embodiment. The converter comprises a first DC link 10, a DC/AC converter 112 comprising a pair of semiconductor switches $S_1$ and $S_2$, an AC intermediate circuit 114, an AC/DC converter 116, and a second DC link 18. Two parallel windings are provided on both the primary side 1001 and the secondary side 1002 of the transformer, and energy transfer inductors $L_{DAB}$ and $L'_{DAB}$ have been split and distributed between the parallel windings, with each winding having an energy transfer inductor with inductance $L_{DAB}/2$ or $L'_{DAB}/2$, respectively for the primary and secondary side. Also shown, merely for background information, is a voltage source connected to the first DC link 10, a resistive load connected to the second DC link 18 and characterized by a resistance $R_{load}$, and (in gray) a reluctance network 19 of a core and a stray flux of the transformer.

Figure 3:
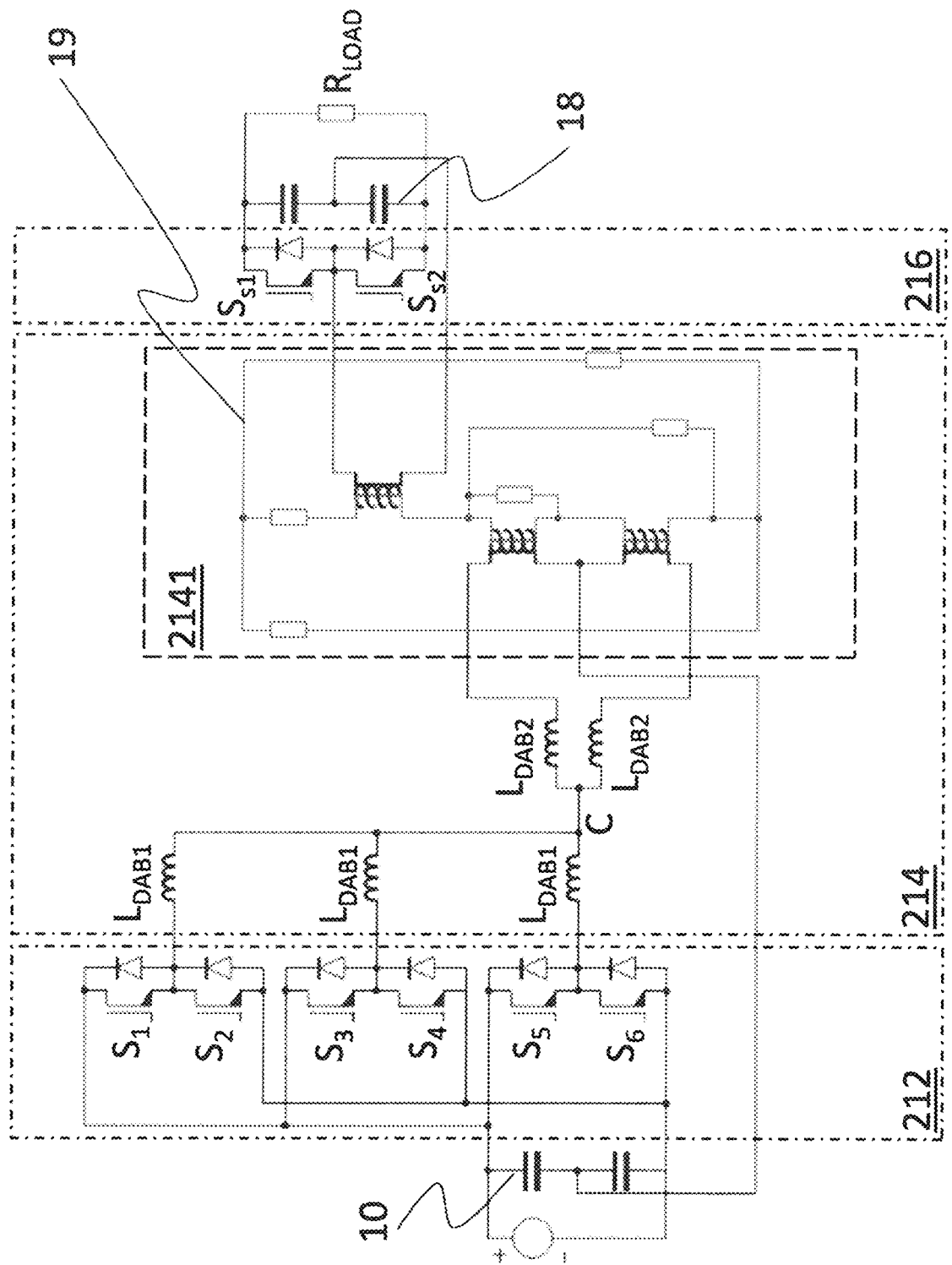
FIG. 3 shows a schematic of an exemplary dual active bridge DC/DC converter in accordance with another embodiment.

FIG. 3 shows a schematic of a dual active bridge DC/DC converter in accordance with another embodiment. The primary coil comprises a plurality of M=2 parallel windings, i.e. windings electrically connected in parallel, with each winding formed by a transformer wire, and wherein each wire or winding is connected to common node C via an individual one of a second plurality (M=2) of inductors $L_{DAB2}$. The converter comprises a first DC link 10, a DC/AC converter 212 comprising a plurality of semiconductor switches $S_1, S_2, S_3, \ldots, S_6$, an AC intermediate circuit 214, an AC/DC converter 216, and a second DC link 18. The converter comprises a plurality of active half bridges which are connected to single, first DC link 10, while each of their outputs is connected via an individual one of a first plurality (N=3) of inductors $L_{DAB1}$ and common node C to a primary coil of a medium frequency transformer 2141, said transformer providing, inter alia, for galvanic insulation between primary and secondary side of said transformer. Providing common node C as a single point of coupling, where inductors $L_{DAB1}$ and inductors $L_{DAB2}$ are all connected, allows to optimize semiconductor switches and transformer wires independently. Inductances of all inductors of the first plurality of inductors $L_{DAB1}$ may be at least essentially identical to one another, in particular for a 1:1 transformer turns ratio. Similarly, inductances of all inductors of the second plurality of inductors $L_{DAB2}$ may be at least essentially identical to one another, albeit not necessarily to the inductances of the first plurality of inductors $L_{DAB1}$. Also shown, merely for background information, is a voltage source connected to the first DC link 10, a resistive load connected to the second DC link 18 and characterized by a resistance $R_{load}$, and (in gray) a reluctance network 19 of a core and a stray flux of the transformer 2141.

Figure 4:
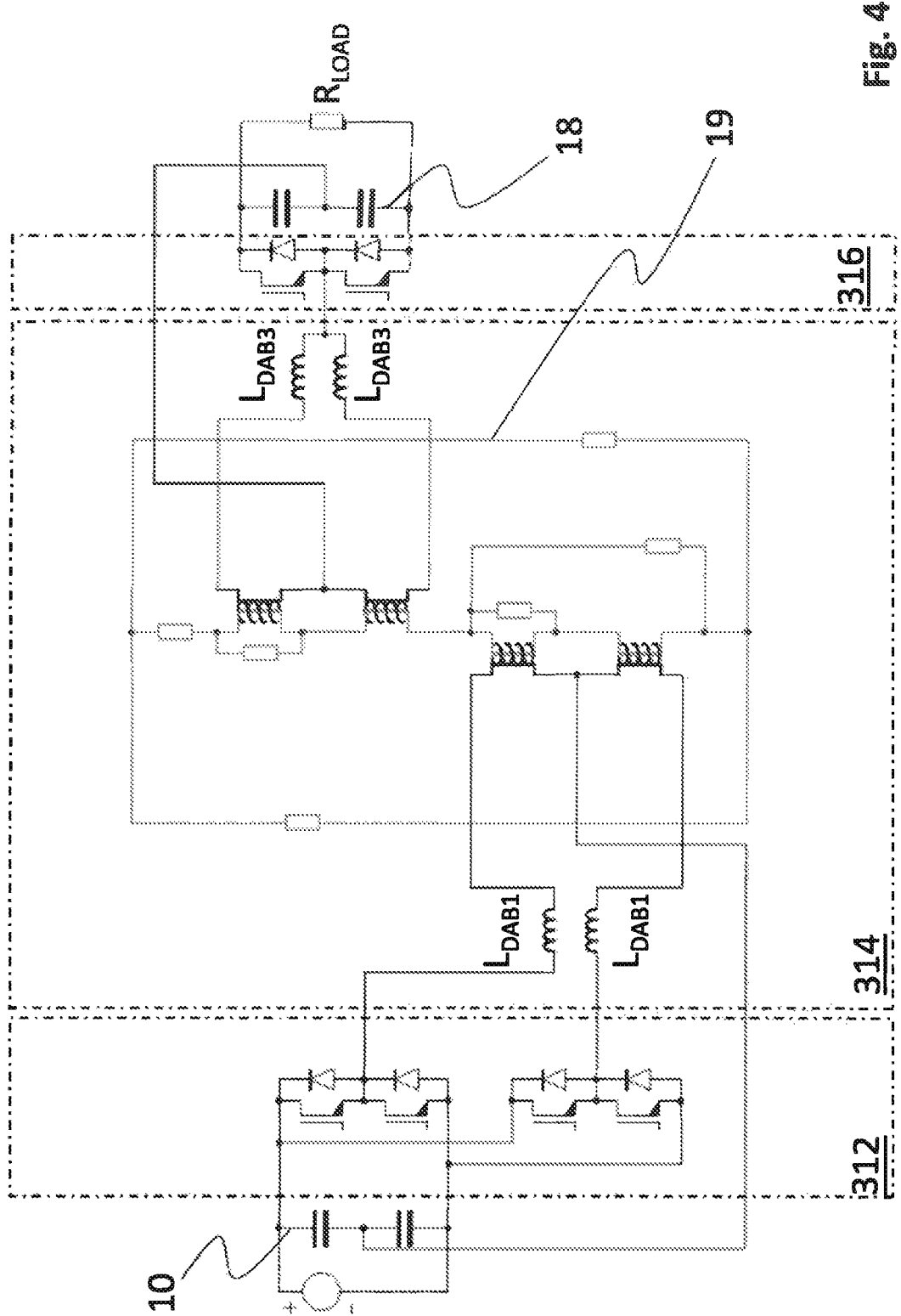
FIG. 4 shows a schematic of an exemplary dual active bridge DC/DC converter in accordance with yet another embodiment.

FIG. 4 shows a schematic of an exemplary dual active bridge DC/DC converter in accordance with yet another embodiment. The converter comprises a first DC link 10, a DC/AC converter 312, an AC intermediate circuit 314, an AC/DC converter 316, and a second DC link 18. The DC/AC converter 312 of the dual active bridge DC/DC converter comprises a plurality of N active half bridges, where N is an integer multiple of a number M of paralleled primary windings of the transformer, or vice versa, for the exemplary choice of N=M=2. As may be seen, the energy transfer inductors $L_{DAB1}$ are not connected to each other at their transformer sides, but are each directly connected to a transformer winding without the presence of a common node as in the previous embodiment. Again inductances of all energy transfer inductors $L_{DAB1}$ may be at least essentially identical to one another, in particular for a 1:1 transformer turns ratio.

In the embodiments as shown in FIGS. 2 to 4, energy transfer inductors $L_{DAB1}$ and—if present—$L_{DAB2}$ replace the energy transfer inductor $L_{DAB}$ of FIG. 1a), and jointly act as energy transfer inductor of the intermediate circuits 114, 214 and 314. Said energy transfer inductors may thus be regarded as a split energy transfer inductors, with each individual one of said inductors acting as a partial energy transfer inductor.

Connecting the parallel transformer windings via split energy transfer inductors prevents circulating currents in the transformer winding which would otherwise create huge losses in MFTs and/or significantly reduce the converter's performance.

Furthermore, if the dual active bridge DC/DC converter comprises a plurality of N>1 active half bridges, current through each active half bridge or bridge leg is no longer defined by power module parasitics, inhomogeneous temperature distributions and/or semiconductor characteristics (which are not perfectly equal for all chips) as a consequence of the presence of partial energy transfer inductors, but by the split energy transfer inductors (which have, in a defined range, a limited maximum deviation from a referenced inductance, e.g. 5%). This makes a current distribution homogenous and stable without requiring additional measures or effort.

In all embodiments shown, the secondary side of the DC/DC converter (as shown on the right hand side of FIGS. 2 to 4 may alternatively be embodied in analogy to the primary side of the same or any other embodiment.

Advantageous characteristics of a dual active bridge DC/DC converter in accordance with the present disclosure are:

- No extra components are required. Splitting the energy transfer inductor as proposed keeps a total inductor size, in particular a total/summed inductance, unchanged.
- An MFT with a single output or secondary side terminal internally connecting all parallel windings can be used which is, e.g. in case of windings made from foil, in particular low-cost foil, easier to build while still able to fulfil strict insulation requirements for high voltage applications.
- Maximum and/or nominal electric power per MFT may be increased, due to an increase of a maximum current a single MFT can handle. This is key to building economically efficient MFTs. In higher-power (and thus larger) MFTs, an insulation effort, in particular a volume required for sufficient insulation is, in a relative sense, reduced. An alternative way of providing higher power via higher current would be to parallel-connect entire resonant converter or dual active bridge converter cells in an SST, or even to parallel-connect entire SSTs, and thus the number of MFTs required. But this would not increase a power level of the individual MFTs.
- Circulating currents in parallel transformer windings which are built from parallel wires are efficiently suppressed due to split split energy transfer inductors which block such currents—this also enables employment of more common litz wire of smaller cross-section, which is potentially probably cheaper, and may be manufactured using reduced effort and resources.
- Allows low-cost realization of dual active bridge DC/DC converter cells, employing and/or enabling off-the-shelf power semiconductor switches for high current applications simply by adding further half bridges.
- No theoretical limitation of a number (N or N') of parallel converter bridges, i.e. power semiconductor switches.
- Allows low-cost realization of resonant converter cells and dual active bridge using wide bandgap semiconductor switches for high current applications, which would otherwise become increasingly difficult due to fast switching speeds and smaller chip size (as compared to non-wide bandgap semiconductor switches).
- Simple, robust, no active current balancing control required.
- Very general concept for dual active bridge DC/DC converters that have to deal with hundreds of amps; not only cells in MV-grid connected SSTs but also for high-power low-voltage applications, as e.g. required in various EV fast charger topologies.

Preferred embodiments of the present disclosure, in particular as described above, may be realized as detailed in the embodiments in accordance with the items listed below, advantageously in combination with one or more of the features as detailed above, or in accordance with the claims as presented further below.

A dual active bridge DC/DC converter, comprising
- a first DC link 10, preferably comprising a first DC link capacitor;
- a converter bridge connected to the first DC link;
- a transformer, preferably a medium frequency transformer, having a primary side and a secondary side;
- the primary side of the transformer comprising a plurality of M>1 primary windings, each of the plurality of primary windings having a first and a second terminal; characterized by
- a first plurality of M energy transfer inductors; wherein
- for each of the M primary windings, a different one from the first plurality of energy transfer inductors is connected between said primary winding bridge and the converter bridge.

A dual active bridge DC/DC converter, comprising
- a first DC link, preferably comprising a first DC link capacitor;
- a DC/AC converter connected to the first DC link and comprising:
  - a converter bridge connected to the first DC link;
- an AC intermediate circuit connected to the DC/AC converter and comprising
  - a transformer, preferably a medium frequency transformer, having a primary side and a secondary side;
  - the primary side comprising a plurality of M>1 primary windings;
  - a first plurality of M energy transfer inductors; wherein
  - for each of the primary windings, a different one from the first plurality of energy transfer inductors is connected between said primary winding bridge and the converter bridge;
- an AC/DC converter connected to the secondary side of the AC intermediate circuit,
- a second DC link, preferably comprising a second DC link capacitor, connected to an output of the AC/DC converter.

The dual active bridge DC/DC converter in accordance with the preceding embodiment, wherein
said dual active bridge DC/DC converter comprises a first plurality of N>1 converter bridges, in particular a total of N>1 converter bridges, connected in parallel to the first DC link; and
the converter further comprises a second plurality of N energy transfer inductors, wherein
each of the second plurality of N energy transfer inductors is connected between one of the converter bridges and a common node (C);
each of the first plurality of M energy transfer inductors is connected between the common node and the first terminal of a different one of the plurality of primary windings.

The dual active bridge DC/DC converter in accordance with any of the preceding embodiments, wherein each of the converter bridges is an inverter half-bridge comprising a first input terminal and a second input terminal, an inverter bridge output (alternatively conductively connectable to the first or second input terminal by means of a plurality of semiconductor switches), wherein for each inverter half-bridge, a different one of the first plurality of energy transfer inductors is connected in series with the inverter bridge output.

The dual active bridge DC/DC converter in accordance with any of the preceding embodiments, with
a plurality O of common nodes with O<N and O<M, in particular a total of O common nodes; wherein
each of the first plurality of N energy transfer inductors is connected between one of the converter bridges and one of the common nodes;
each of the second plurality of M energy transfer inductors is connected between one of the common nodes and the first terminal of a different one of the plurality of primary windings.

The dual active bridge DC/DC converter in accordance with any of the preceding embodiments, wherein M≠N, preferably M<N The dual active bridge DC/DC converter in accordance with the embodiment listed under the first and second item, wherein the converter comprises a first plurality of M>1 converter bridges, wherein the converter bridges and the primary windings are connected in pairs via a different one from the first plurality of energy transfer inductors connected between each connected pair comprising one of the converter bridges and one of the primary windings.

The dual active bridge DC/DC converter in accordance with any of the preceding embodiments, wherein
each of the converter bridges is an inverter half-bridge comprising a first input terminal and a second input terminal, an inverter bridge output (alternatively conductively connectable to the first or second input terminal by means of a plurality of semiconductor switches),
each energy transfer inductor has a first terminal and a second terminal, and wherein
for each inverter half-bridge, the first terminal of each of the respective one of the plurality of energy transfer inductors is connected to the respective inverter bridge output, and
the second terminal of each of the energy transfer inductors from the first plurality of M energy transfer inductors is connected to a different primary winding.

The dual active bridge DC/DC converter in accordance with any of the preceding embodiments, wherein
each of the converter bridges is an inverter half-bridge comprising a first input terminal and a second input terminal, an inverter bridge output (alternatively conductively connectable to the first or second input terminal by means of a plurality of semiconductor switches),
each energy transfer inductor has a first terminal and a second terminal, and wherein
for each inverter half-bridge, the first terminal of each of the respective one of the plurality of energy transfer inductors is connected to the respective inverter bridge output, and
the second terminals of all energy transfer inductors from the second plurality of N energy transfer inductors are connected together at the common node.

The dual active bridge DC/DC converter in accordance with any of the preceding embodiments, wherein the second terminals of all of the plurality of primary windings are connected together.

The dual active bridge DC/DC converter in accordance with any of the preceding embodiments, wherein the first DC link has a positive terminal and negative terminal,
the first input terminals of all inverter half-bridges are connected to the positive terminal, and
the second input terminals of all inverter half-bridges are connected to the negative terminal.

The dual active bridge DC/DC converter in accordance with any of the preceding embodiments, wherein the first DC link further has a neutral terminal and the second terminals of all of the plurality of primary windings are connected to the neutral terminal.

The dual active bridge DC/DC converter in accordance with any of the preceding embodiments, further comprising
a second DC link, preferably comprising a second DC link capacitor.

The dual active bridge DC/DC converter in accordance with any of the preceding embodiments, further comprising
a second converter bridge connected to the second DC link;
the secondary side of the transformer comprising a plurality of M'>1 secondary windings, each of the plurality of secondary windings having a first and a second terminal;
a third plurality of M' energy transfer inductors; and wherein
for each of the M' secondary windings, a different one from the third plurality of energy transfer inductors is connected between said secondary winding bridge and the second converter bridge.

The dual active bridge DC/DC converter in accordance with any of the preceding embodiments, with
a second plurality of N'>1 converter bridges, in particular a total of of N'>1 converter bridges, connected in parallel to the second DC link; wherein
the converter further comprises a fourth plurality of N' energy transfer inductors, wherein
for each converter bridge from the second plurality of N'>1 converter bridges, a different one from the fourth plurality of energy transfer inductors is connected between said converter bridge and the plurality of secondary windings.

The dual active bridge DC/DC converter in accordance with any of the preceding embodiments, with
a second plurality of N'>1 converter bridges connected in parallel to the second DC link;
the converter further comprises a fourth plurality of N' energy transfer inductors, wherein
each of the fourth plurality of N' energy transfer inductors is connected between one of the converter bridges and a further common node (C);
each of the third plurality of M' energy transfer inductors is connected between the further common node and the first terminal of a different one of the plurality of secondary windings.

The dual active bridge DC/DC converter in accordance with any of the preceding embodiments, wherein
each one of the first plurality of N>1 converter bridges is an inverter bridge;
the secondary side of the transformer comprises at least one secondary winding; the converter further comprising:
a second plurality of N'>1 rectifier bridges connected in parallel to the second DC link;
a fourth plurality of N' energy transfer inductors, wherein for each rectifier bridge, a different one from the fourth plurality of energy transfer inductors is connected between said rectifier bridge and the plurality of secondary windings.

The dual active bridge DC/DC converter in accordance with any of the preceding embodiments, wherein the converter bridges of the first plurality of N>1 converter bridges are active bridges, preferably configured to operate in an at least essentially synchronized manner, and if present, the converter bridges of the second plurality of converter bridges are also active bridges, preferably configured to operate in an at least essentially synchronized manner.

Unless specified otherwise, a connection, in particular between any two entities, including in particular nodes, points, terminals, elements, devices, etc. or combinations thereof, refers to an electrically conductive connection, as in particular established by a wire, cable, busbar, a conductive track, trace or line on e.g. a (printed) circuit board, solder, etc. The electrically conductive connection is preferably at least substantially direct, in particular without any discrete elements, as, in particular, resistors, capacitors, inductors, or other passive or active elements or devices connected between the connected entities. The electrically conductive connection thus has at least essentially negligible resistance, capacitance and inductance, preferably at least essentially zero resistance, capacitance and inductance. In particular, resistance, capacitance and inductance of the electrically conductive connection are exclusively parasitic by nature. Further, resistance, capacitance and inductance of the electrically conductive connection significantly smaller (preferably by a factor of $1/100$, $1/1000$ or $1/10000$) than resistances, capacitances and impedances of resistors, capacitors or inductors, respectively, connected by the electrical conductive connection, and/or comprised by an electric circuit or network which comprises the electrically conductive connection.

Unless specified otherwise, an electric connection or electrical connection is identical to connection as defined above.

Unless specified otherwise, if two entities, including in particular nodes, points, terminals, elements, devices, etc. or combinations thereof, are said to be connected, electrically connected or to be (electrically) connected together, a connection as defined above exists between the two entities.

Unless specified otherwise, if a first and a second entity, including in particular a first and second node, point, terminal, element, device, etc. or combinations thereof, are said to be connected via a third entity, including in particular a third node, point, terminal, element, device, or with such a third entity (in) between, a connection as described above exists between the first and third entities as well as between the third and second entities. However, no connection as described above, in particular no at least substantially direct connection exists between the first and second entities. If explicitly specified, the third element may in particular also be a connection, in particular a conductor, wire, cable, busbar etc. In such case, it may be assumed that no connection as described above other than the specified one is present.

Unless stated otherwise, it is assumed that throughout this patent application, a statement "a≈b" implies that $|a-b|/(|a|+|b|)<10$, preferably $|a-b|/(|a|+|b|)<100$, wherein "a" and "b" may represent arbitrary variables as described and/or defined anywhere in this patent application, or as otherwise known to a person skilled in the art. Further, a statement that "a" is at least approximately equal or at least approximately identical to "b" implies that a≈b, preferably a=b. Further, unless stated otherwise, it is assumed that throughout this patent application, a statement a>>b implies that a>10b, preferably a>100b; and statement a<<b implies that 10a<b, preferably 100a<b.

Unless stated otherwise, N, M, O, N', M', O', are used throughout this disclosure to represent integer numbers.

This description and the accompanying drawings that illustrate aspects and embodiments of the present subject matter should not be taken as limiting the claims defining the protected subject matter. In other words, while the subject matter has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the subject matter. Thus, it will be understood that changes and modifications may be made by those of ordinary skill within the scope of the following claims. In particular, the present disclosure covers further embodiments with any combination of features from different and/or individual embodiments as described above and below. Embodiments in accordance with the various embodiments may, in particular, include further and/or additional features, elements, aspects, etc. not shown in the drawings or described above.

The disclosure also covers all further features shown in the Figures, individually, although they may not have been described in the afore or following description. Also, individual alternatives of the embodiments described in the Figure and the description and individual alternatives of features thereof can be disclaimed from the subject matter or from disclosed subject matter. The disclosure comprises subject matter consisting of the features defined in the claims or the exemplary embodiments as well as subject matter comprising said features.

Furthermore, in the claims the word "comprising" does not exclude further or additional features, elements, steps etc., and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute, property or a value particularly also comprise exactly the attribute, property or value, respectively, as stated. The term "approximately" or "about" in the context of a given numerate value or range refers to a value or range that is, e.g., within 20%, within 10%, within 5%, or within 2% of the given value or range, and, in particular, also comprises the exact value or range as stated. Components described as coupled or connected may be electrically or mechanically directly coupled, or they may be indirectly coupled via one or more intermediate components. Any reference signs in the claims shall not be construed as limiting the scope.

The invention claimed is:

1. A dual active bridge DC/DC converter, comprising:
a first DC link;
a first plurality of N converter bridges connected to the first DC link, N being an integer;
a transformer having a primary side and a secondary side;

the primary side of the transformer comprising a second plurality of M primary windings, M being an integer, each of the second plurality of M primary windings having a first terminal and a second terminal; and a first plurality of N first energy transfer inductors connected at a common node, a second energy transfer inductor being connected between said common node and the plurality of converter bridges, and each first terminal of the M primary windings being connected to the common node via a second plurality of energy transfer inductors and wherein each second terminal of the M primary windings are connected together.

2. The dual active bridge DC/DC converter according to claim 1, wherein said plurality of N converter bridges are connected in parallel to the first DC link.

3. The dual active bridge DC/DC converter according to claim 1, wherein each of the converter bridges is an inverter half-bridge comprising a first input terminal and a second input terminal, and an inverter bridge output, wherein for each inverter half-bridge, a third energy transfer inductor is connected in series with the inverter bridge output.

4. The dual active bridge DC/DC converter according to claim 2, further comprising:

a plurality O of common nodes, O being an integer, with O<N and O<M, and wherein each of the first plurality of N energy transfer inductors is connected between one of the converter bridges and one of the common nodes; and each of the second plurality of M energy transfer inductors is connected between one of the common nodes and the first terminal of a different one of the plurality of primary windings.

5. The dual active bridge DC/DC converter according to claim 2, wherein M<N.

6. The dual active bridge DC/DC converter according to claim 1, wherein the converter bridges and the primary windings are connected in pairs via a third energy transfer inductor connected between each connected pair comprising one of the converter bridges and one of the primary windings.

7. The dual active bridge DC/DC converter according to claim 2, wherein:

each of the converter bridges is an inverter half-bridge comprising a first input terminal and a second input terminal, and an inverter bridge output, each energy transfer inductor has a first terminal and a second terminal, for each inverter half-bridge, the first terminal of each of the respective one of the plurality of energy transfer inductors is connected to the respective inverter bridge output, and the second terminals of all energy transfer inductors from the second plurality of N energy transfer inductors are connected together at the common node.

8. The dual active bridge DC/DC converter according to claim 1, wherein:

each of the converter bridges is an inverter half-bridge comprising a first input terminal and a second input terminal, an inverter bridge output alternatively conductively connectable to the first or second input terminal by means of a plurality of semiconductor switches, each energy transfer inductor has a first terminal and a second terminal, for each inverter half-bridge, the first terminal of each of the respective one of the plurality of energy transfer inductors is connected to the respective inverter bridge output, and the second terminal of each of the energy transfer inductors from the first plurality of M energy transfer inductors is connected to a different primary winding.

9. The dual active bridge DC/DC converter according to claim 1, wherein:

the first DC link has a positive terminal and negative terminal, the first input terminals of all inverter half-bridges are connected to the positive terminal, and the second input terminals of all inverter half-bridges are connected to the negative terminal.

10. The dual active bridge DC/DC converter according to claim 1, wherein the first DC link further has a neutral terminal and the second terminals of all of the plurality of primary windings are connected to the neutral terminal.

11. The dual active bridge DC/DC converter according to claim 1, further comprising:

a second DC link comprising a second DC link capacitor.

12. The dual active bridge DC/DC converter according to claim 11, further comprising:

a second converter bridge connected to the second DC link;

the secondary side of the transformer comprising a plurality of M' secondary windings, M' being a positive integer, greater than one, each of the plurality of secondary windings having a first and a second terminal; and a third plurality of M' energy transfer inductors, wherein, for each of the M' secondary windings, a different one from the third plurality of energy transfer inductors is connected between said secondary winding bridge and the second converter bridge.

13. The dual active bridge DC/DC converter according to claim 12, with:

a second plurality of N' converter bridges connected in parallel to the second DC link, N' being an integer, and the converter further comprises a fourth plurality of N' energy transfer inductors, wherein each of the fourth plurality of N' energy transfer inductors is connected between one of the converter bridges and a further common node, and each of the third plurality of M' energy transfer inductors is connected between the further common node and the first terminal of a different one of the plurality of primary windings.

14. The dual active bridge DC/DC converter according to claim 2, wherein the converter bridges of the first plurality of N converter bridges are active bridges, configured to operate in an at least essentially synchronized manner.

15. The dual active bridge DC/DC converter according to claim 1, wherein first DC link comprises a first DC link capacitor.

16. The dual active bridge DC/DC converter according to claim 1, wherein the transformer is a medium frequency transformer.

17. The dual active bridge DC/DC converter according to claim 2, wherein M≠N.

18. The dual active bridge DC/DC converter according to claim 14, wherein the converter bridges of the second plurality of converter bridges are also active bridges, configured to operate in an at least essentially synchronized manner.

19. The dual active bridge DC/DC converter according to claim 3, wherein the inverter bridge output is alternatively conductively connectable to the first input terminal or the second input terminal by means of a plurality of semiconductor switches.

20. The dual active bridge DC/DC converter according to claim 7, wherein the inverter bridge output is alternatively conductively connectable to the first input terminal or the second input terminal by means of a plurality of semiconductor switches.

* * * * *